(12) United States Patent
Chow et al.

(10) Patent No.: US 7,479,346 B1
(45) Date of Patent: Jan. 20, 2009

(54) BATTERY PACK

(75) Inventors: Lu Chow, San Gabriel, CA (US); Paul Berg, Chatsworth, CA (US); Alexandru Z. Pal, Montrose, CA (US)

(73) Assignee: Quallion LLC, Sylmar, CA (US)

( * ) Notice: Subject to any disclaimer, the term of this patent is extended or adjusted under 35 U.S.C. 154(b) by 169 days.

(21) Appl. No.: 11/201,987

(22) Filed: Aug. 10, 2005
(Under 37 CFR 1.47)

Related U.S. Application Data (60) Provisional application No. 60/601,285, filed on Aug. 13, 2004.

(51) Int. Cl.
*H01M 2/24* (2006.01)
(52) U.S. Cl. ........................... 429/158; 320/112
(58) Field of Classification Search .......... 320/110, 320/112, 116, 117, 119, 120, 124, 125, 126; 429/97, 98, 99, 100, 153, 158, 160, 161, 429/178, 211, 247
See application file for complete search history.

(56) References Cited

U.S. PATENT DOCUMENTS

| | | | | | |
|---|---|---|---|---|---|
| 2,901,526 | A | * | 8/1959 | Huntley et al. | 429/121 |
| 3,769,095 | A | * | 10/1973 | Schmidt | 429/151 |
| 4,957,829 | A | * | 9/1990 | Holl | 429/99 |
| 5,017,441 | A | * | 5/1991 | Lindner | 429/9 |
| 5,140,744 | A | * | 8/1992 | Miller | 29/730 |
| 5,302,110 | A | * | 4/1994 | Desai et al. | 429/96 |
| 5,378,555 | A | * | 1/1995 | Waters et al. | 429/97 |
| 5,437,939 | A | * | 8/1995 | Beckley | 429/99 |
| 5,504,415 | A | * | 4/1996 | Podrazhansky et al. | 320/118 |
| 5,516,603 | A | * | 5/1996 | Holcombe | 429/127 |
| 5,534,765 | A | | 7/1996 | Kreisinger et al. | |
| 5,596,567 | A | | 1/1997 | deMuro et al. | |
| 5,639,571 | A | * | 6/1997 | Waters et al. | 429/71 |
| 5,641,587 | A | | 6/1997 | Mitchell et al. | |
| 5,652,499 | A | * | 7/1997 | Morita et al. | 320/112 |
| 5,709,280 | A | * | 1/1998 | Beckley et al. | 180/68.5 |
| 5,736,272 | A | * | 4/1998 | Veenstra et al. | 429/99 |
| 5,851,695 | A | * | 12/1998 | Misra et al. | 429/159 |
| 6,002,240 | A | | 12/1999 | McMahan et al. | |
| 6,373,222 | B2 | | 4/2002 | Odaohhara | |
| 6,462,551 | B1 | * | 10/2002 | Coates et al. | 324/431 |
| 6,465,986 | B1 | | 10/2002 | Haba | |
| 6,524,739 | B1 | * | 2/2003 | Iwaizono et al. | 429/61 |
| 6,565,986 | B2 | | 5/2003 | Itoh | |
| 6,586,132 | B1 | * | 7/2003 | Fukuda et al. | 429/120 |
| 6,639,408 | B2 | * | 10/2003 | Yudahira et al. | 324/434 |
| 6,781,343 | B1 | | 8/2004 | Demachi et al. | |
| 6,980,859 | B2 | | 12/2005 | Powers et al. | |
| 2002/0183801 | A1 | | 12/2002 | Howard et al. | |
| 2003/0058595 | A1 | * | 3/2003 | Murabayashi et al. | 361/90 |

(Continued)

FOREIGN PATENT DOCUMENTS

EP      1460698 A1 *    9/2004

*Primary Examiner*—Akm E Ullah
*Assistant Examiner*—M'baye Diao (57) ABSTRACT

The battery pack includes bus lines connecting a plurality of source trains in parallel. Each source train includes a plurality of voltage sources connected in series. Each voltage source includes one or more batteries. The battery pack also includes one or more balance lines providing electrical communication between the source trains such that a voltage source in one of the source trains is connected in parallel with a voltage source in one or more of the other source trains.

32 Claims, 8 Drawing Sheets

U.S. PATENT DOCUMENTS

| | | |
|---|---|---|
| 2003/0129457 A1 | 7/2003 | Kawai et al. |
| 2003/0141842 A1* | 7/2003 | Izawa et al. .................. 320/116 |
| 2003/0186116 A1 | 10/2003 | Tanjou |
| 2004/0018419 A1* | 1/2004 | Sugimoto et al. .............. 429/61 |
| 2004/0058233 A1 | 3/2004 | Hamada et al. |
| 2004/0095098 A1 | 5/2004 | Turner et al. |
| 2004/0096713 A1 | 5/2004 | Ballantine et al. |
| 2004/0201365 A1 | 10/2004 | Dasgupta et al. |
| 2004/0253512 A1* | 12/2004 | Watanabe et al. ........... 429/210 |
| 2006/0076923 A1 | 4/2006 | Eaves |
| 2006/0208692 A1 | 9/2006 | Kejha |
| 2007/0029124 A1 | 2/2007 | DasGupta et al. |

* cited by examiner

Figure 7 ly have large power requirements, these power sources typically include several large batteries. However, difficulties associated with managing the thermal characteristics of large batteries can make these batteries impractical for use in powering vehicles.

BATTERY PACK

REFERENCE TO RELATED APPLICATIONS

This application claims the benefit of U.S. Provisional Patent Application Ser. No. 60/601,285; filed on Aug. 13, 2004; entitled "Battery Pack;" and incorporated herein in its entirety.

FIELD

The present invention relates to electrochemical devices and more particularly to battery packs.

BACKGROUND

Electrical power sources have been developed for powering movement of vehicles such as cars. Because these vehicles have large power requirements, these power sources typically include several large batteries. However, difficulties associated with managing the thermal characteristics of large batteries can make these batteries impractical for use in powering vehicles.

An alternative to the use of large batteries is a battery pack that includes a collection of smaller individual batteries. One version of prior power packs connects several battery trains in series where each battery train includes a plurality of batteries in series. Because the batteries in a series discharge differently, it is often desirable to monitor each battery in the series to prevent damage to the batteries. For instance, secondary batteries can often be damaged by dropping below a particular voltage level on discharge or by being charged above a particular voltage level during charging. As a result, each of the batteries in the battery pack can be monitored to prevent any one of the batteries from falling below a certain voltage on discharge or rising above a certain voltage upon charging. The battery monitoring requirements increase as the number of batteries in the battery pack increases. These extensive monitoring characteristics are undesirable and can be impractical for battery packs having large numbers of individual batteries.

An alternate battery pack connects battery groups in series where each of the batteries in a battery group is connected in parallel. As a result, these battery packs require several parallel connections. Each parallel connection must carry the current provided by the battery pack. As the current level to be provided by the battery pack increases, the size of these parallel connections must be increased. The current requirements needed to power a vehicle cause these parallel connections to be undesirably large and heavy. The large size of these parallel connections makes these battery packs impractically large and heavy for use in powering vehicles.

For the above reasons there is a need for a battery pack that is suitable for use in powering vehicles.

SUMMARY

A battery pack is disclosed. The battery pack includes bus lines connecting a plurality of source trains in parallel. Each source train includes a plurality of voltage sources connected in series. Each voltage source includes one or more batteries. The battery pack also includes one or more balance lines providing electrical communication between the source trains such that a voltage source in one of the source trains is connected in parallel with a voltage source in one or more of the other source trains. In some instances, the balance lines provide electrical communication between the source trains such that each voltage source in each of the source trains is connected in parallel with a voltage source in each of the other source trains.

In some instances, one or more of the voltage source includes a plurality of batteries connected in parallel and/or one or more of the voltage source includes a plurality of batteries connected in series. In a preferred embodiment, each of the voltage sources included in a source train consists of a single battery.

In one embodiment of the battery pack, series lines connect each voltage source in a source train in series with another voltage source in the same source train. The balance lines each include one or more cross lines that provide electrical communication between different series lines. In some instances, the battery pack includes a balance connector connected to a portion of the batteries so as to serve as a balance line and as series lines. The balance connector can have a one-piece construction. For instance, the balance connector can be stamped from a sheet of metal. In some instances, the balance connector includes a plurality of tabs extending from a common region, each of the tabs prove electrical communication between a battery and the common region. The balance connector can optionally include one or more holes extending through the balance connector to permit liquid flow though the balance connector. The holes can be positioned over a gap between batteries adjacent to one another so as to permit liquid flow through the holes into the gap. In some instances, the balance connector is arched along a lateral axis.

The batteries employed in the battery pack can each include features that prevent a battery from acting as a short in the event that the battery fails. Examples of these features include, but are not limited to, shut down separators, current interruption devices and burst discs.

A power supply system is also disclosed. The power supply system includes a battery pack and a processing unit configured to monitor a voltage differential between at least two of the balance lines and/or between at least one balance line and a bus line. Vehicles that employ the battery pack and/or power supply system are also disclosed. Additionally, methods of preparing the battery pack and the power supply system are also disclosed.

BRIEF DESCRIPTION OF THE FIGURES

FIG. 4A through FIG. 4C illustrates an embodiment of the battery pack that includes a case for holding batteries. The case includes a base and a cover.

DESCRIPTION

The battery pack includes a plurality of source trains connected in parallel by bus lines. Each source train includes a plurality of voltage sources connected in series. Each voltage source includes one or more batteries. In a preferred embodiment, each voltage source consists of a single battery. The battery pack also includes one or more balance lines. Each balance line provides electrical communication between the source trains such that a voltage source in one of the source trains is connected in parallel with a voltage source in the other source trains. For instance, a source train can include one or more series lines that each connect two batteries in series. A balance line can provide electrical communication between the series lines in two or more source trains.

In some instances, the battery trains and balance lines are arranged such that each voltage source is connected in parallel with a voltage source in each of the other source trains. Accordingly, when each voltage source consists of a single battery, each battery in a source train is connected in parallel with a single battery from each of the other source trains.

During discharge of the battery pack, current can flow from a battery through a balance line or through a series line. However, the series lines carry the primary current flow while the balance lines allow the power level to be balanced out between the batteries connected in parallel. Because this balancing does not require large amounts of current to pass through the balance lines, the balance lines need not be as large or as heavy as prior parallel connections. Accordingly, the balance lines allow the size and weight of the battery pack to be reduced relative to the size and weight of battery packs that connect battery groups in parallel.

During use of the battery pack, each of the batteries connected in parallel is maintained at the same voltage. As a result, the voltage of each battery connected in parallel by two balance lines can be concurrently monitored by monitoring the two balance lines. Further, the voltage of each battery connected in parallel by a balance line and a bus line can be concurrently monitored by monitoring the balance line and the bus line. As a result, this arrangement reduces the need to monitor each of the batteries in the battery pack.

The batteries employed in the battery pack can each include features that prevent a battery from acting as a short in the event battery failure. Examples of these features include, but are not limited to, shut down separators, current interruption devices and burst discs. These features allow one or more batteries in the battery pack to fail without causing failure of the battery pack. As a result, the battery pack can provide safety and performance characteristics to a vehicle that are not available when large batteries are employed.

Figure 1:
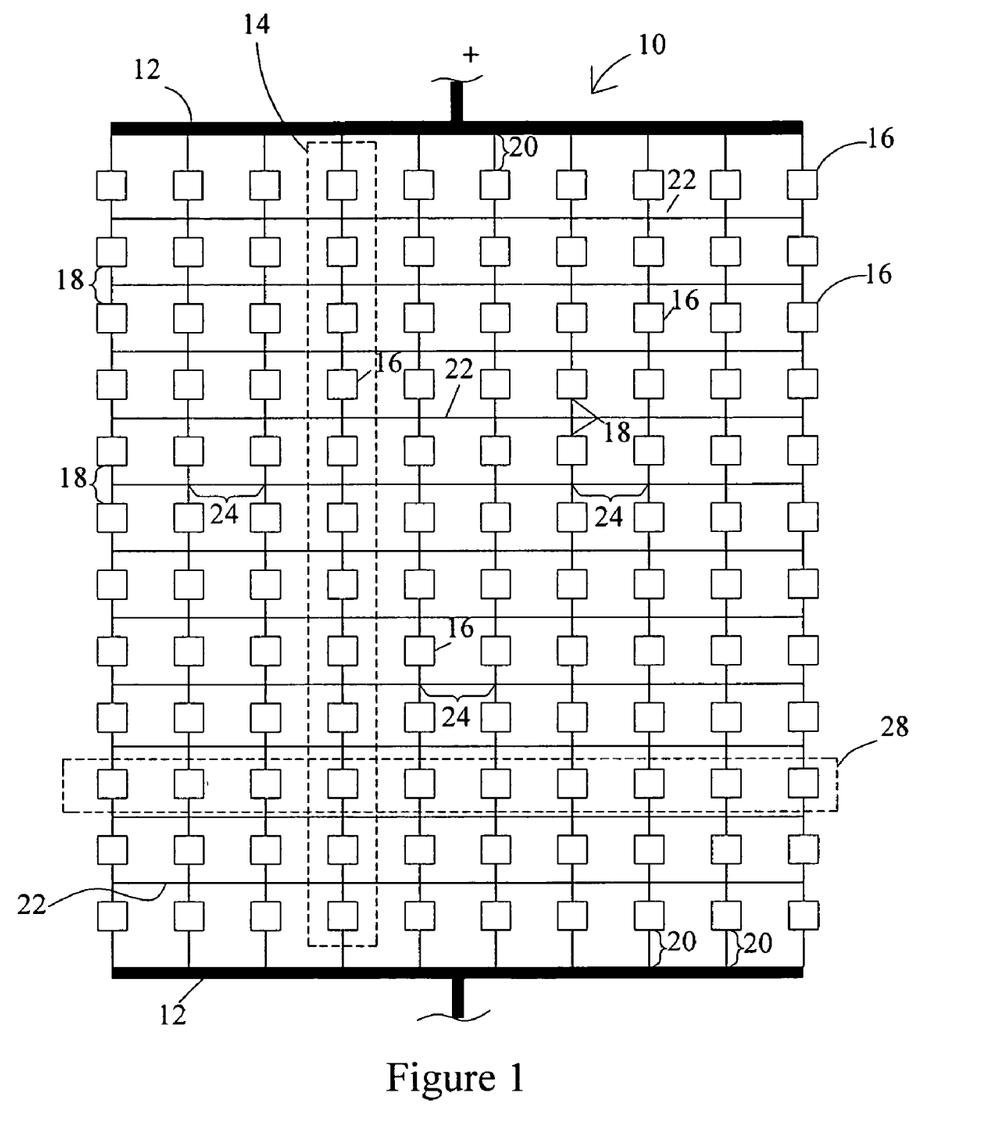
FIG. 1 is a schematic diagram of a battery pack. The battery pack includes bus lines connecting a plurality of source trains in parallel. Each source train includes a plurality of voltage sources connected in series. The battery pack also includes series lines that each provide the serial connections between the voltage sources in the source trains. The battery pack also includes cross lines providing electrical communication between the series lines in different source trains.

FIG. 1 provides a schematic diagram of the battery pack 10. The battery pack includes two bus lines 12 that connect ten source trains 14 in parallel. The source trains 14 each include twelve voltage sources 16 connected in series. Series lines 18 provide electrical communication between the voltage sources 16 connected in series and bus connection lines 20 each provide electrical communication between a source train 14 and a bus line 12.

The battery pack also includes a plurality of balance lines 22. The balance lines 22 each include one or more cross lines 24 that provide electrical communication between series lines 18 in different source trains 14. Accordingly, each balance line 22 provides a parallel connection between the voltage sources 16 in different source train 14. For instance, each balance line 22 provides electrical communication between different source trains 14 such that a voltage source 16 in one of the source trains 14 is connected in parallel with a voltage source 16 in the other source trains 14. Because a single balance line 22 only provides one of the parallel connections, another connection is needed to connect voltage sources 16 in parallel. The other parallel connection can be provided by another balance line 22 or by a bus line 12.

Each of the voltage sources 16 includes one or more batteries. In some instances, one or more of the voltage source 16 includes a plurality of batteries connected in parallel and/or one or more of the voltage source 16 includes a plurality of batteries connected in series. However, the voltage monitoring requirements of the power pack may increase as the number of series connected batteries in a voltage source 16 increases. Each of the voltage sources 16 included in the source trains 14 can be the same or different. In a preferred embodiment, each of the voltage sources 16 is the same. In a preferred embodiment, each of the voltage sources 16 consists of a single battery.

A voltage source 16 can include electrical components in addition to batteries. For instance, a voltage source 16 can include one or more resistors and one or more capacitors in addition to the one or more batteries. In a preferred embodiment, each of the voltage sources 16 consists of one or more batteries and the associated electrical connections.

Each of the voltage sources 16 connected in parallel belongs to a parallel group 28. Accordingly, the battery pack of FIG. 1 includes twelve parallel groups 28. In instances where a plurality of the voltage sources 16 include more than two batteries, each of the voltage sources 16 in the same parallel group can include the same number and arrangement of batteries. As an example, each of the voltage sources 16 in the same parallel group can include the same number of batteries connected in series. Alternately, one or more of the voltage sources 16 in the same parallel group can have a different number and arrangement of batteries.

The power pack illustrated in FIG. 1 can be scaled to include more batteries or fewer batteries. For instance, the battery pack can include four or more batteries, twelve or more batteries, twenty five or more batteries, eighty one or more batteries, one hundred or more batteries. The number of batteries in each parallel group can be the same or different from the number of batteries in each source train 14. The number of batteries in each source train 14 can be increased in order to increase the voltage of the battery pack or decreased in order to decrease the voltage of the battery pack. Each source train 14 can include two or more batteries; four or more batteries; more than eight batteries; or fifteen or more batteries. The number of source trains 14 can be increased for applications that require higher power levels or decreased for applications that require lower power levels. The battery pack can include two or more source trains 14; four or more source trains 14; ten or more source trains 14; or fifteen or more source trains 14.

The battery packs can be configured to provide more than 9 V or more than 12 V. Additionally or alternately, the battery packs can be configured to provide more than 50 watt-hours, more than 100 watt-hours or more than 240 watt-hours. Many of the issues resolved by the battery pack, such as the size and weight of multiple parallel connections, do not become relevant until the battery pack is used with a large number of batteries and/or for applications requiring high power levels. As a result, the battery pack is suitable for high power applications such as powering the movement of vehicles such as trucks, cars and carts. For these high power applications, the battery pack is preferably configured to provide more than 18 V, more than 24 V or more than 32 V. Additionally or alternately, the battery pack is preferably configured to provide more than 240 watt-hours, more than 500 watt-hours or more than 1000 watt-hours. In some instances, the above performance levels are achieved using a battery pack where the batteries in the source trains 14 each have a voltage of less than 14 V, 10 V or 5 V.

Although FIG. 1 illustrates the balance lines 22 providing electrical communication between the source trains 14 such that a voltage source 16 in one of the source trains 14 is connected in parallel with a voltage source 16 in each of the other source trains 14, the balance lines 22 can provide electrical communication between the source trains 14 such that a voltage source 16 in one of the source trains 14 is connected in parallel with a voltage source 16 in a portion of the other source trains 14.

Although not illustrated in FIG. 1, the battery pack can include other electrical connections between the bus lines 12. For instance, other source trains can be connected between the bus lines 12 but not otherwise electrically connected to the illustrated source trains.

Figure 2:
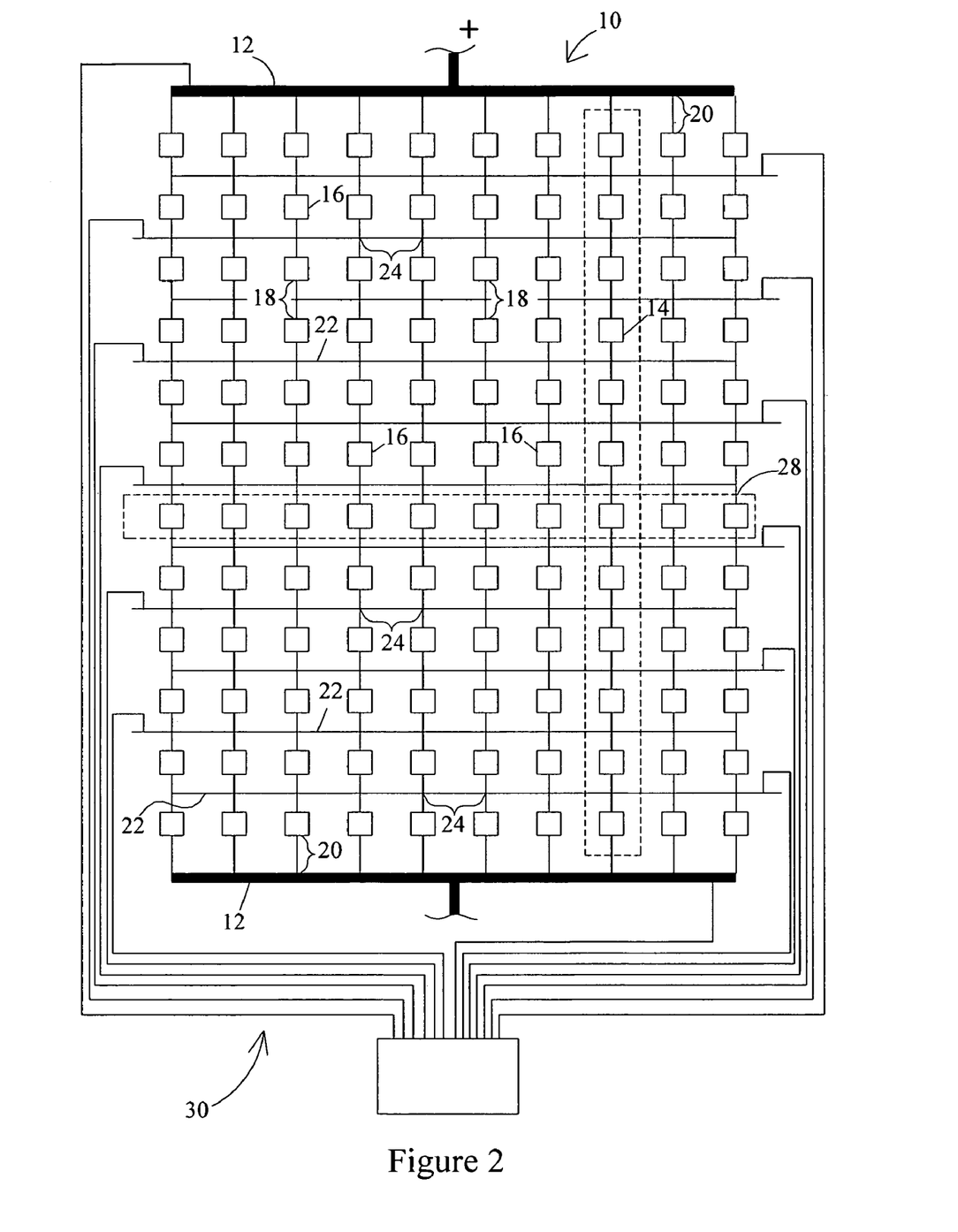
FIG. 2 illustrates a power supply system that includes the battery pack of FIG. 1.

FIG. 2 illustrates a power supply system 30. The system includes the battery pack 10 of FIG. 1 and a processing unit. The bus lines 12 and the balance lines 22 are each connected to the processing unit. The processing unit can monitor the voltage differential between different balance lines 22 or between a balance line 22 and a bus line 12. As noted above, the balance lines 22 cause the voltage of each battery in a parallel group to be the same. As a result, the processing unit can determine the voltage of each battery in a parallel group by measuring the potential difference between the lines that provide the parallel connections for that parallel group. For instance, the processing unit can determine the voltage of the batteries in a parallel group associated with two balance lines 22 by measuring the voltage differential between the balance lines 22. Further, the processing unit can determine the voltage of the batteries in a parallel group associated with a balance line 22 and a bus line 12 by measuring the voltage differential between the balance line 22 and the bus line 12.

During operation of the power supply system, the processing unit can monitor the voltage of the batteries in each parallel group and control the performance of the battery pack based on the results of this monitoring. For instance, secondary batteries can often be damaged by dropping below a particular voltage level on discharge or by being increased above a particular voltage level during charge. Accordingly, the processing unit can stop discharge of the battery pack in the event that the voltage of one or more of the parallel groups falls below a lower threshold voltage. Additionally or alternately, the processing unit can stop discharge of the battery pack in the event that the voltage of one or more of the parallel groups rises above an upper threshold voltage.

Suitable processing units can include, but are not limited to, an analog electrical circuits, digital electrical circuits, processors, microprocessors, digital signal processors (DSPs), computers, microcomputers, or combinations suitable for performing the required control and calculation functions. In some instances, the processing unit has access to a memory that includes instructions to be executed by the processing unit during performance of the control and monitoring functions.

Figure 3A:
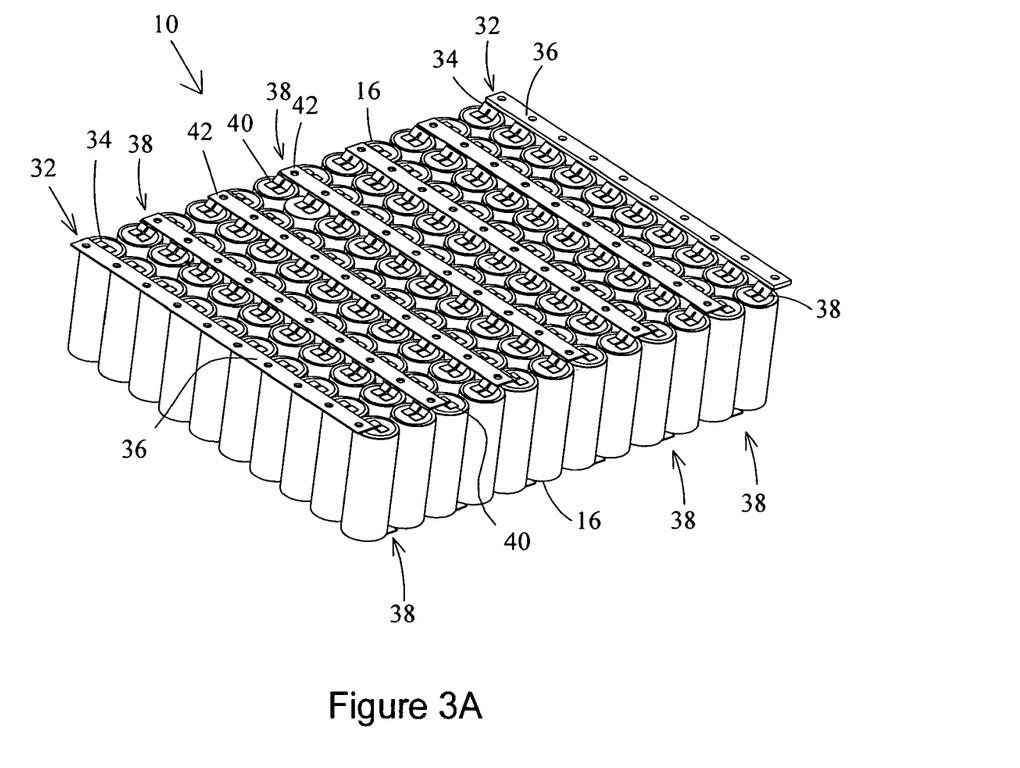
FIG. 3A illustrates an embodiment of a battery pack having electrical connections as illustrated in the battery pack of FIG. 1.

FIG. 3A illustrates an embodiment of a battery pack having electrical connections as illustrated in the battery pack of FIG. 1A. The battery pack includes one hundred and twenty batteries that each have a terminal at one end of the battery and another terminal at the other end of the battery. The battery pack includes two bus connectors 32 that serve as the bus lines 12 disclosed in FIG. 1A. Each bus connector 32 includes tabs 34 extending from a common region 36. The tabs 34 are each in electrical communication with a terminal of a battery and serve as a bus connection line while the common region 36 serves as a bus line.

The battery pack further includes a plurality of balance connectors 38. Each balance connector 38 includes tab regions 40 extending from a common region 42. The tab regions 40 are each in electrical communication with a terminal of a battery and serve as a series line 18 while the common regions 42 each serves as a balance line. The battery pack includes balance connectors 38 on the bottom of the battery pack. These balance connectors 38 provide the electrical connections between the terminals on the opposite ends of the batteries. Electrical communication can be achieved between a tab region 40 and a battery by attaching the tab region 40 to a terminal of the battery. Suitable methods for attaching a tab 34 or a tab region 40 to a battery include, but are not limited to, welding.

As noted above, lower current levels are conducted through the balance lines than are conducted through the bus lines. As a result, the bus connectors 32 have larger cross sectional areas than the balance connectors 38. A suitable method of constructing the bus connector 32 includes connecting the tabs 34 to a metal bar. Suitable materials for the bar include, but are not limited to, copper, nickel or other highly conductive materials. The bar should be large enough to successfully carry the current levels that will be provided by the battery pack. Suitable materials for the tabs 34 include, but are not limited to, highly conductive materials such as nickel. Nickel can offer the advantage of high corrosion resistance.

Figure 3B:
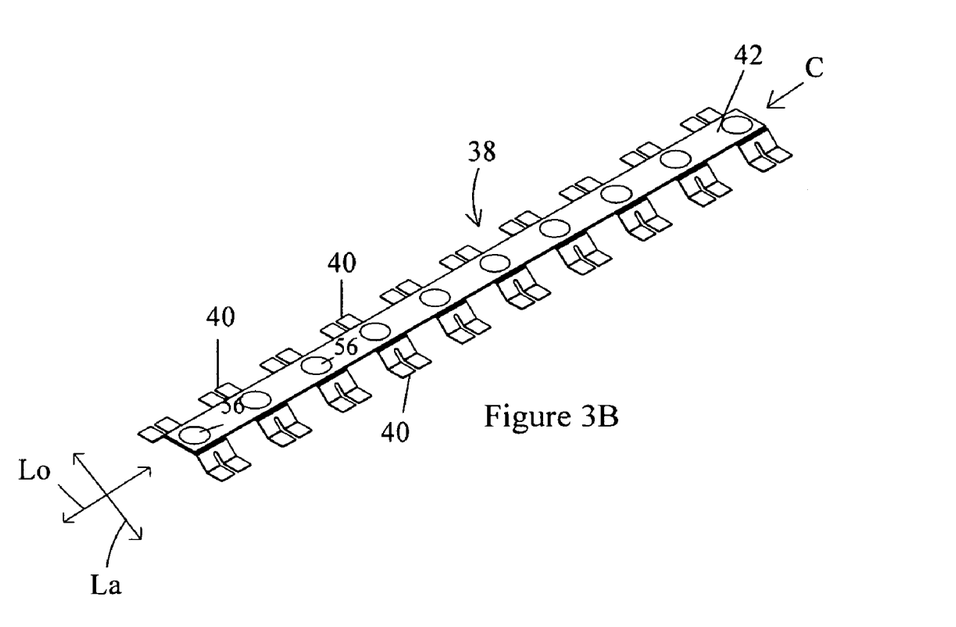
FIG. 3B is a perspective view of a balance connector that can serve as both cross lines and as series lines.
Figure 3C:
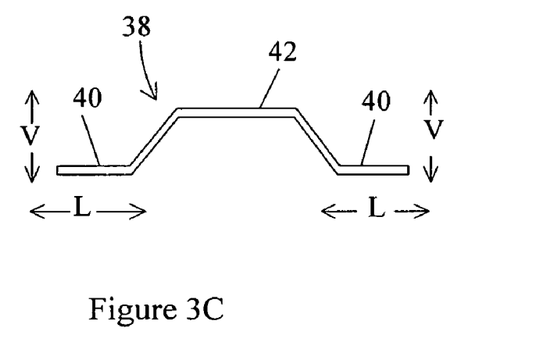
FIG. 3C is a side view of the balance connector shown in FIG. 3B taken looking in the direction of the arrow labeled C in FIG. 3B.

FIG. 3B is a perspective view of an example of a balance connector 38. FIG. 3C is a side view of the balance connector 38 shown in FIG. 3B taken looking in the direction of the arrow labeled C. The balance connector 38 includes a longitudinal axis labeled Lo and a lateral axis labeled La. The balance connector 38 is arched along the lateral axis. In the balance connector 38 of FIG. 3C, the arch extends from a tab region 40 on one side of the longitudinal to a tab region 40 on the other side of the longitudinal axis. The arch permits formation of a hinge mid-way along the length of a tab and/or at the intersection of a tab and the common region 42. The hinges can be formed by a crease, corner or fold in the balance connector 38. The arch allows the batteries to move relative to one another. For instance, the arch and/or the hinges enhance the amount of lateral movement that the batteries can have relative to one another as illustrated by the arrows labeled L in FIG. 3C. Additionally, the arch and/or hinges enhances the amount of vertical movement the batteries can have relative to one another as illustrated by the arrows labeled V. The enhanced movement provided by the structure of the balance connector 38 increases the amount of stress the battery pack can experience without disruption. For instance, a battery pack employed to power a vehicle will likely experience considerable levels of vibration. The structure of the balance connector 38 reduces the opportunity for these vibrations to disrupt the integrity of the electrical connections in the battery pack.

Figure 3D:
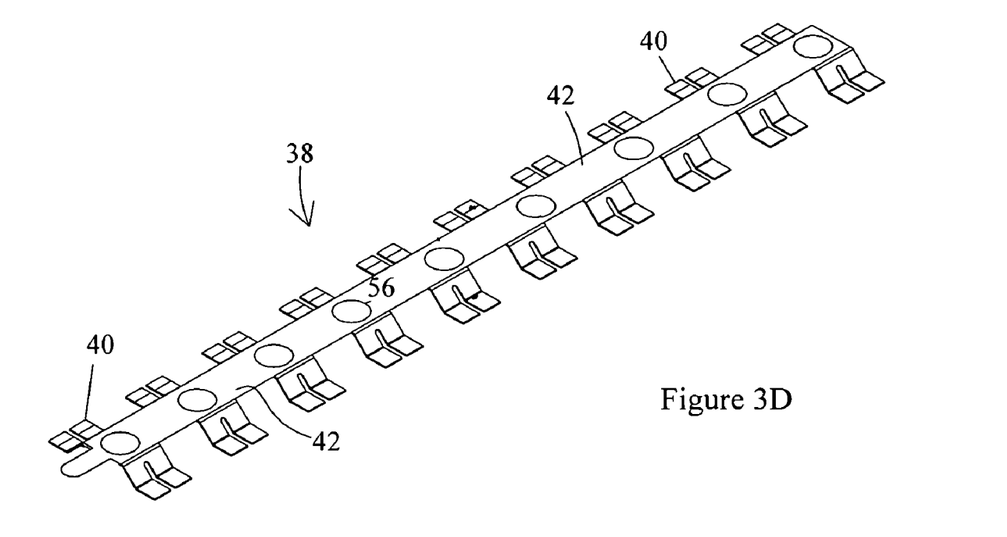
FIG. 3D is a perspective view of another embodiment of a balance connector.

FIG. 3D is a perspective view of another embodiment of a balance connector 38. The balance connector 38 includes a tab extending from an end of the common region 42. The tab can be in electrical communication with the processing unit of FIG. 2. For instance, wires can be connected to the tab and to the processing unit. Accordingly, the processing unit can use this connection to monitor the voltage differential between the balance connector 38 and other balance connectors 38 or between the balance connector 38 and a bus connector.

Figures 4A, 4B:
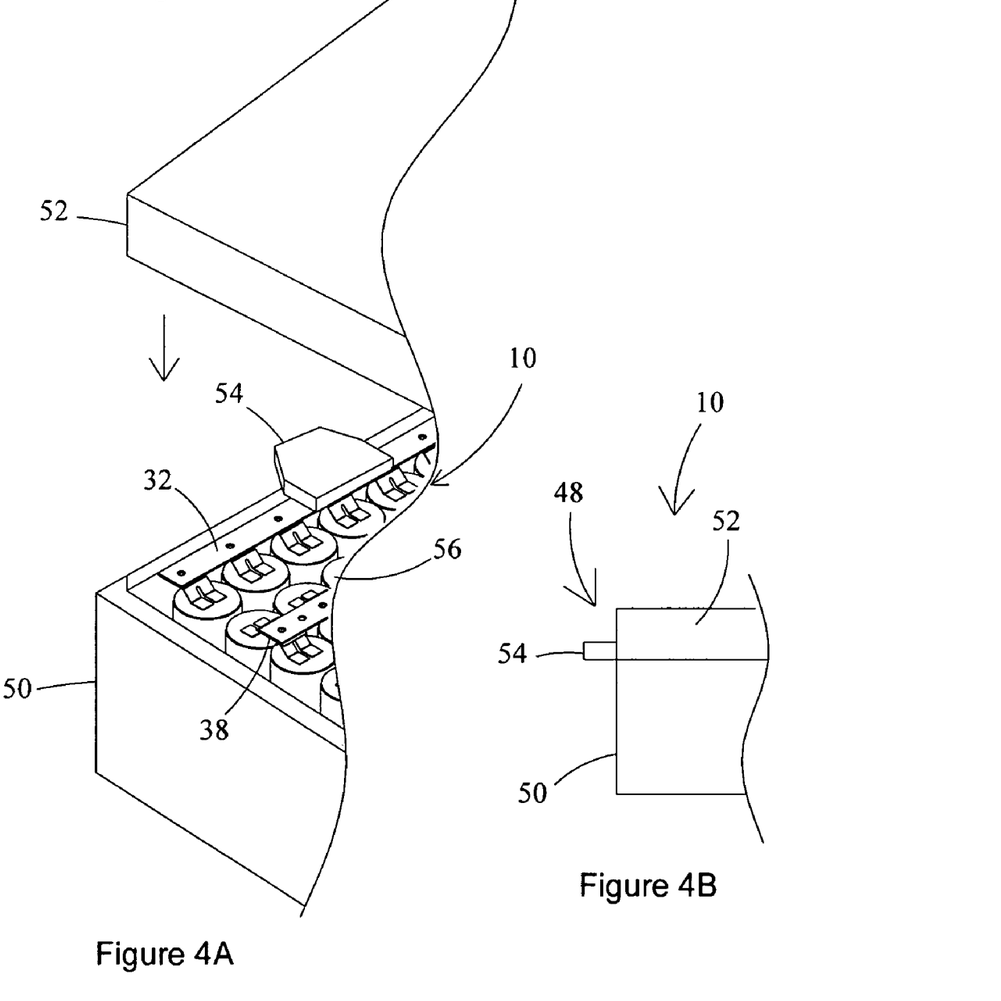
FIG. 4A is a perspective view of the case before attaching the cover to the base.
FIG. 4B is a sideview of the battery pack shown in FIG. 4A after attaching the cover to the base.
Figure 4C:
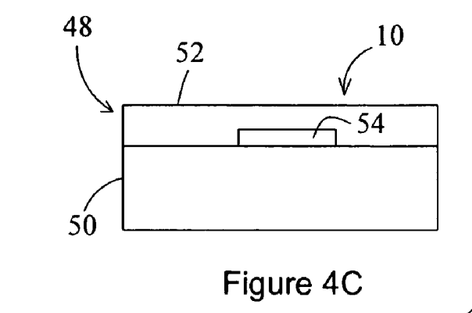
FIG. 4C is a different sideview of the battery pack than is shown in FIG. 4B.

The battery pack can include a case 48 as illustrated in FIG. 4A through FIG. 4C. The case can includes a base 50 and a cover 52. FIG. 4A is a perspective view of the case before attaching the cover 52 to the base 50. FIG. 4B and FIG. 4C are different sideview of the case after attaching the cover 52 to the base 50. The case defines an interior configured to hold the batteries as evident in FIG. 4A. Terminals 54 are shown attached to the bus connectors 32. The terminals 54 can be constructed from a metals structure and can be attached to the bus connectors by weldings, bolts or other conventional fastening technique. In the embodiment of the case shown in FIG. 4A through FIG. 4C, the terminals 54 extend through the case to permit access from outside of the case.

In some instances, a liquid is positioned in the case along with the batteries. The case can include one or more inlets (not shown) and one or more outlets (not shown) through which the liquid can be circulated through the case from an outside source. Alternately, the liquid can be limited to the interior of the case. In some instances, the liquid is a cooling liquid for regulation to regulate the temperature of the battery pack on charge and/or on discharge. The balance connector 38 can include one or more holes 56 extending through the common region 42 as is best illustrated in FIG. 3C. The holes 56 are sized to permit flow of the liquid through the balance connector 38. In some instances, the holes 56 in the balance connector 38 are positioned over a gap in the batteries. As a result, the liquid can flow through the holes 56 and into the gap between the batteries. The ability to flow into the gaps can enhance the degree of cooling provided by a cooling liquid. Although not illustrated, one or more gaskets can be positioned between the cover 52 and the base 50 to seal the liquid within the case. When the terminals can be accessed from outside the case, one or more gaskets can be positioned between the terminal and the case in order to further seal the liquid within the case.

In some instances, the process unit disclosed in the context of FIG. 2 is also positioned in the case. When a liquid is also positioned in the case, the case can include a compartment for holding the processing unit separate from the liquid. Alternately, the processing unit can be packaged so as to remain functional while in contact with the liquid. In some instances, the processing unit is located outside of the case.

The batteries can include one or more safety features to ensure that current flow through the battery is reduced or stopped in the event of battery stress or failure. As a result, these safety features can reduce the opportunity for a short in the battery pack. An example of a suitable safety feature is a shut-down separator. A battery generally includes an electrolyte activating one or more cathodes and one or more anodes.

A separator is positioned between the anode(s) and cathode(s) in a battery and permits migration of ions through the separator. A shut-down separator is selected to prevent or reduce passage of ions through the separator once the temperature in the battery rises above a threshold temperature. As a result, a shut-down operator can cease operation of the battery once the temperature in the battery exceeds the temperature threshold.

An example shut-down separator includes openings such as pores, perforations or apertures through which the ions pass during discharge of the battery. The shut-down separator material can be selected such that the passage of the ions through the pores or openings is reduced or stopped once the threshold temperature is exceeded. For instance, the shut-down separator can be constructed from a material that begins to flow at the threshold temperature. The flow can completely or partially seal the openings in the separator and can accordingly reduce or prevent flow of ions through the openings. Examples of materials suitable for use as shut-down separators include, but are not limited to, polyolefin's such polyethylene, polypropylene and combinations thereof.

Figure 5A:
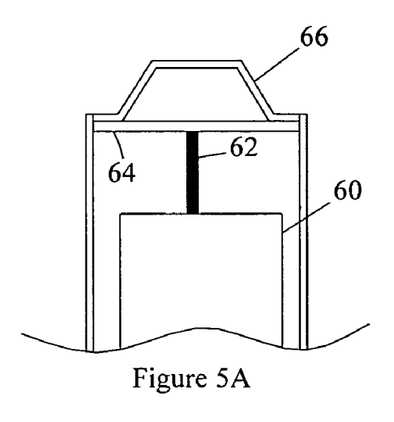
FIG. 5A is a cross section of a battery having a current interruption device configured to interrupt current flow from a battery once the pressure in the battery exceeds a threshold pressure. The battery is illustrated before the threshold pressure is exceeded.
Figure 5B:
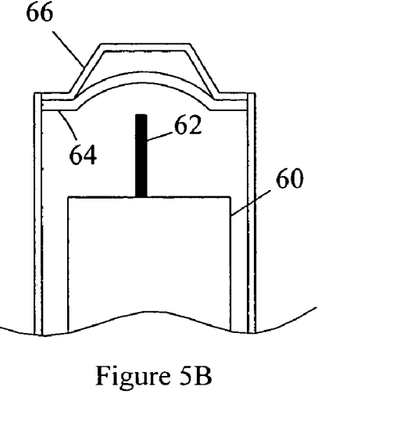
FIG. 5B illustrates the battery of FIG. 5A after the threshold pressure is exceeded.

The batteries can also include a current interruption device. An example current interruption device interrupts current flow from a battery once the pressure in the battery exceeds a threshold pressure. FIG. 5A and FIG. 5B illustrate operation of a current interruption device. FIG. 5A is a cross section of a battery before the threshold pressure is reached. FIG. 5B is a cross section of the battery after the threshold pressure is reached. The battery includes an electrode region 60 where the anode(s), cathode(s), separator and electrolyte are positioned. The electrodes in the electrode region can have a variety of arrangements including, but not limited to, jelly roll, wound or stacked.

The battery also includes a tab 62, an electrically conducting diaphragm 64 and a cap 66 that serves as a terminal for the battery. During operation of the battery, the conducting member is in contact with the tab 62 as illustrated in FIG. 5A. The diaphragm 64 is electrically conductive and provides electrical communication between the cap 66 and the tab 62. In the event the pressure in the battery rises above the threshold pressure, the diaphragm 64 deforms such that the contact between the tab and the diaphragm is broken. The break in contact between the tab 62 and the diaphragm 64 stops the flow of current through the battery.

Figure 6A:
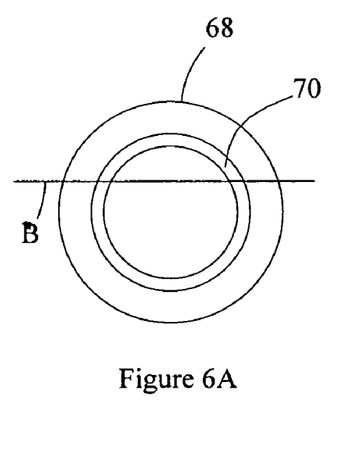
FIG. 6A is a sideview of a burst disc.
Figure 6B:
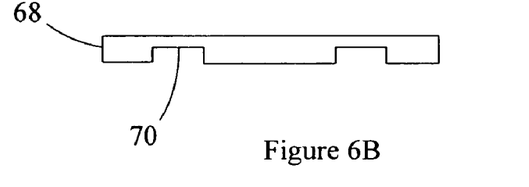
FIG. 6B is a cross-section of the burst disc shown in FIG. 6A taken along the line labeled B.

The batteries can also include a burst disc. A burst disc is a member of the battery casing that includes one or more regions of weakness. The one or more regions of weakness cause the disc to rupture at a pressure below the pressure at which the disc would rupture without the region(s) of weakness. Accordingly, the member having the regions of weakness ruptures before the battery would rupture without use of the burst disc. The early disruption prevents the pressure in the battery from reaching dangerous levels. The regions of weakness can be defined by holes, perforations or openings. FIG. 6A and FIG. 6B illustrate an example of a burst disc 68. FIG. 6A is a sideview of the burst disc 68. FIG. 6B is a cross-section of the burst disc 68 shown in FIG. 6A taken along the line labeled B. A recess 70 extends into the burst disc 68. The recess 70 serves as a region of weakness along which the disc can burst.

Figure 6C:
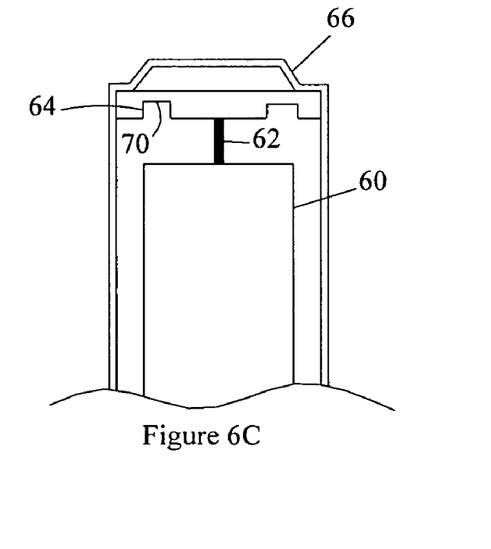
FIG. 6C is a cross section of a battery including a burst disc as illustrated in FIG. 6A.

A battery can include both a burst disc and a current interruption device. FIG. 6C is a cross section of the battery shown in FIG. 5A with a diaphragm that serves as a burst disc. A recess extends into the diaphragm. The recess surrounds a region of the diaphragm as illustrated in FIG. 6A and FIG. 6B. In the event that pressure in the battery rises above a threshold pressure, the diaphragm ruptures at the recess. As a result, the diaphragm ruptures before the pressure in the battery rises to a dangerous level. Although the perforations are shown in the diaphragm, the perforations can also be included in the cap or terminal. Accordingly, the cap or terminal can also serve as a burst disc. Additionally, the disc need not be round. The region of weakness need not define a round area on the disc and can be a line, a triangle or have a different shape. Further, the shape of the disc that includes the one or more regions of weakness need not have a round shape. For instance, the disc can be square, rectangular or have another shape.

All or a portion of the batteries in the battery pack can include one or more of the above features. For instance, each battery included in a source train can include one or two safety features selected from a group consisting of, a shut-down separator, a current interruption device and a burst disc. In a preferred embodiment, each of the batteries in each of the source trains includes a shut-down separator, a current interruption device and a burst disc.

Figure 7:
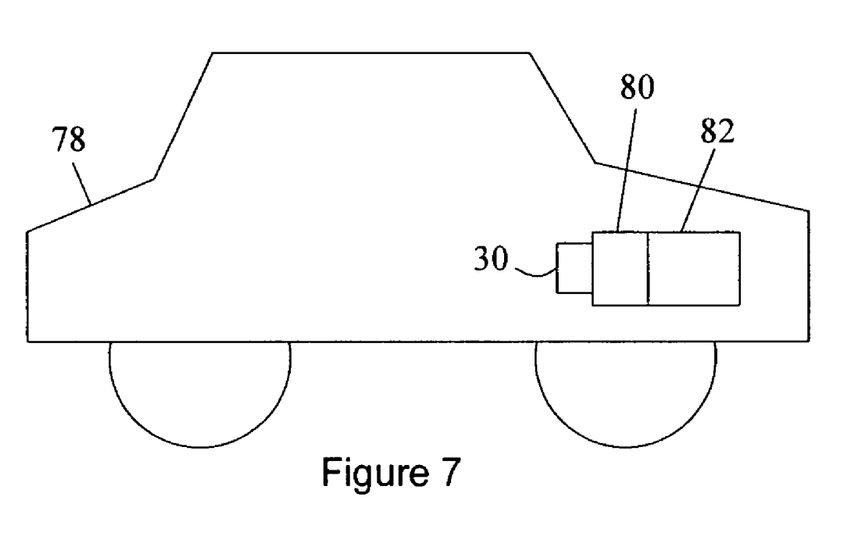
FIG. 7 illustrates a power supply system that includes one or more of the battery packs employed in a vehicle.

The battery pack can be employed to power movement of a vehicle. Examples of suitable vehicles are vehicles configured to hold and transport living people such as cars, truck and golf-carts. In some instances, the vehicles are for transporting people on land. FIG. 7 illustrates a power supply system 30 employed in a vehicle 78. The vehicle 78 includes a power source 80 connected to a power train 82. The power train is configured to transmit power from the power source 80 to a drive mechanism (not shown) such as a drive axel. The power source 80 can include a motor and/or engine. The power supply system 30 can assist the motor and/or engine in generating movement of the vehicle. Alternately, the power supply system can be the only source of power provided to the power source.

The batteries employed in the source trains can be primary or secondary batteries. When the battery pack is employed to power movement of a vehicle, the batteries are preferably secondary batteries to allow re-charging of the batteries after use of the vehicle. In some instances, the batteries are lithium ion secondary batteries. However, commercially available lithium ion batteries include a PTC device (positive temperature coefficient device). These PTC devices can break down at high voltages. As a result, commercially available lithium ion batteries are generally limited to battery packs that include source trains that individually provide fewer than 32 V, i.e. source trains with fewer than eight 4 V voltage sources. However, the battery pack is often used with higher voltage applications. Accordingly, the battery pack often includes source trains having more than 8 voltage sources. In some instances, the battery pack often includes source trains having more than eight 4V voltage sources. In these instances, the battery pack can employ batteries that exclude PTC devices.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A battery pack, comprising:
   bus lines connecting a plurality of source trains in parallel, each source train including a plurality of voltage sources connected in series and each voltage source including one or more batteries;
   one or more balance lines providing electrical communication between the source trains such that the voltage sources are arranged in a plurality of parallel groups, each parallel group including a voltage source in one of the source trains connected in parallel with a voltage source from each of the source trains and each voltage source is not included in more than one of the parallel groups; and
   a balance connector connected to a portion of the voltage sources,
      the balance connector serving as the balance line and also as series lines,
      the balance connector includes a plurality of tabs extending from a common region,
      the tabs providing electrical communication between one of the voltage sources and the common region.

2. The pack of claim 1, wherein series lines connect each voltage source in a source train in series with another voltage source in the same source train; and
   the one or more balance lines provide electrical communication between different source trains, the balance lines each including one or more cross lines providing electrical communication between different series lines.

3. The pack of claim 1, wherein the one or more balance lines provide electrical communication between the source trains such that a voltage source in one of the source trains is connected in parallel with a voltage source in each of the other source trains.

4. The pack of claim 1, wherein each voltage source consists of a single battery.

5. The pack of claim 1, wherein the balance lines provide electrical communication between the source trains such that each voltage source in each of the source trains is connected in parallel with a voltage source in each of the other source trains.

6. The pack of claim 5, wherein each voltage source consists of a single battery.

7. The pack of claim 1, wherein the bus lines connect four or more source trains in parallel.

8. The pack of claim 1, wherein each source train includes more than eight batteries.

9. The pack of claim 1, wherein the battery pack includes four or more source trains.

10. The pack of claim 1, wherein the battery pack provides more than 24 V.

11. The pack of claim 1, wherein the battery pack provides more than 1000 watt-hours.

12. The pack of claim 1, further comprising:
   a case having an interior holding the voltage sources and a cooling liquid positioned in contact with the voltage sources.

13. The pack of claim 1, wherein the balance connector has a one-piece construction.

14. The pack of claim 1, wherein the tabs are each connected directly to the voltage sources for which the tab provides electrical communication with the common region.

15. The pack of claim 1, wherein one or more holes extend through the balance connector, the holes being sized to permit liquid flow though the holes.

16. The pack of claim 15, wherein the holes are positioned over a gap between batteries adjacent to one another so as to permit liquid flow through the holes into the gap.

17. The pack of claim 15, wherein the bus lines include a plurality of tabs extending from a metal bar, each of the tabs providing electrical communication between a voltage source and the metal bar.

18. The pack of claim 1, wherein each of the batteries includes a safety shut-down separator.

19. The pack of claim 1, wherein the safety shut-down separator includes one or more components selected from the group consisting of polyethylene and polypropylene.

20. The pack of claim 1, wherein each of the batteries includes a current interruption device, the current interruption device configured to interrupt flow of current from a battery in response to elevation of pressure within the battery without destruction of the battery.

21. The pack of claim 1, wherein the current interruption device is configured to interrupt an electrical connection between a tab and a terminal of the battery.

22. The pack of claim 1, wherein each battery includes a burst disc.

23. The pack of claim 1, wherein each battery includes a shut down separator, a current interruption device and a burst disc.

24. A battery pack comprising:
bus lines connecting a plurality of source trains in parallel, each source train including a plurality of voltage sources connected in series and each voltage source including one or more batteries, series lines connecting two voltage sources in the same source train in series;
one or more balance lines providing electrical communication between different source trains such that the voltage sources are arranged in a plurality of parallel groups, each parallel group including a voltage source in one of the source trains connected in parallel with a voltage source from each of the source trains and each voltage source in one of the parallel groups is not included in more than one of the parallel groups, the balance lines each including one or more cross lines providing electrical communication between different series lines; and
a balance connector connected to a portion of the voltage sources,
the balance connector serving as the balance line and also as series lines,
the balance connector includes a plurality of tabs extending from a common region, and
the tabs providing electrical communication between one of the voltage sources and the common region.

25. A power supply system, comprising:
a battery pack that includes
bus lines connecting a plurality of source trains in parallel, each source train including a plurality of voltage sources connected in series and each voltage source including one or more batteries, and
one or more balance lines providing electrical communication between the source trains such that the voltage sources are arranged in a plurality of parallel groups, each parallel group including a voltage source in one of the source trains connected in parallel with a voltage source from each of the other source trains and each voltage source in one of the parallel groups is not included in more than one of the parallel groups;
a processing unit configured to monitor a voltage differential between at least two of the balance lines and/or between at least one balance line and a bus line; and
a balance connector connected to a portion of the voltage sources,
the balance connector serving as the balance line and also as series lines,
the balance connector includes a plurality of tabs extending from a common region, and
the tabs providing electrical communication between one of the voltage sources and the common region.

26. The system of claim 25, wherein the processing unit is configured to monitor the voltage differential between each pair of balance lines that connect voltage sources in parallel.

27. The system of claim 25, wherein the processing unit is configured to monitor the voltage differential between each pair of lines that connect voltage sources in parallel and that includes a balance line and a bus line.

28. The system of claim 25, wherein the processing unit is configured to stop discharge of the battery pack in response to results from monitoring the voltage differential.

29. The system of claim 25, wherein the processing unit is configured to stop discharge of the battery pack in response to a monitored voltage differential falling below a threshold voltage.

30. The system of claim 25, wherein the processing unit is configured to stop charging of the battery pack in response to results from monitoring the voltage differential.

31. The system of claim 30, wherein the processing unit is configured to stop charging of the battery pack in response to a monitored voltage differential rising above a threshold voltage.

32. The pack of claim 1, wherein the balance connector consists of a single piece of stamped metal.

* * * * *